O. M. JONES.
VALVE.
APPLICATION FILED SEPT. 11, 1918.

1,364,062.

Patented Dec. 28, 1920.

INVENTOR
Owen Marshall Jones

UNITED STATES PATENT OFFICE.

OWEN MARSHALL JONES, OF NEW YORK, N. Y.

VALVE.

1,364,062.　　　　　Specification of Letters Patent.　　Patented Dec. 28, 1920.

Application filed September 11, 1918. Serial No. 253,537.

*To all whom it may concern:*

Be it known that I, OWEN MARSHALL JONES, a citizen of the United States, and a resident of the borough of Manhattan, city, county, and State of New York, have invented an Improvement in Valves, of which the following is a specification.

This invention relates to improvements in valves of the type known as thermostatic air valves, which are used for exhausting air from a steam radiator or from any vessel containing steam or heated vapor. This invention may be used in any connection in which it is found applicable.

The objects of the invention are to improve upon such valves so as to produce them as nearly perfect in efficiency and operation as is possible.

Other objects of the invention are to produce such a valve having an inlet chamber, a combined thermostat and valve chamber, and a thermostat which is as nearly indestructible as is possible to make it.

Further objects of the invention are to produce a thermostatic valve having a thermostat comprising a metal tube crimpled to form a plurality of bends and having a volatile fluid confined within the tube and a suitable end piece attached to each end of the tube for engaging the thermostat in operatable position.

Further objects of the invention are to produce such a valve having a valve body or casing with an inlet chamber with a float therein and a combined thermostat and valve chamber, and one which can be employed without the float in the inlet chamber when the float is not required in special applications for which the valve is used.

Further objects are to produce a thermostatic valve having an adjustable air valve seat and an air valve within the valve body or casing and a cushion spring to prevent the air valve seat and the air valve from being damaged by jamming together when the valve seat is improperly adjusted.

Further objects will be apparent from the following description.

An illustrative embodiment of the invention has been selected herein for the purpose of description, same being shown in the accompanying drawings, wherein—

Figure 1:
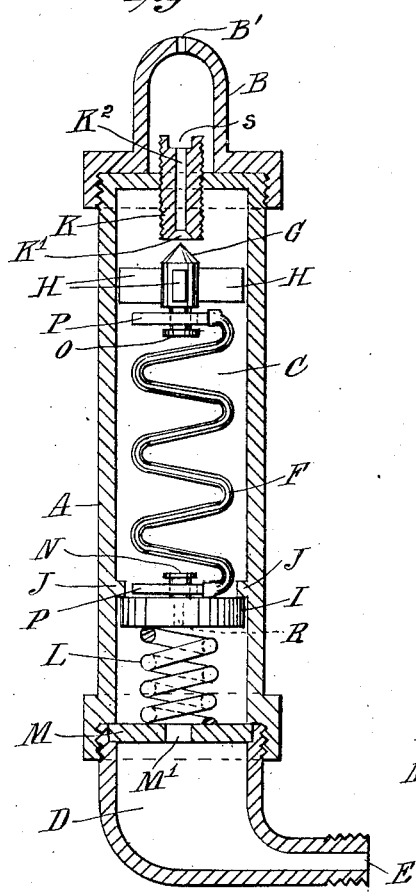
Figure 1 is a longitudinal sectional view of a valve.

Referring to the drawings,

In Fig. 1 I have illustrated a valve which is to be employed where liquid does not enter the valve body; this view shows the valve open. A is a valve body or casing consisting of a plurality of sections. B is a cap or cover with an air port B' through its top. C is a combined thermostat and valve chamber. D is an inlet chamber. E is an inlet to the valve body and the inlet chamber. F is a thermostat comprising a metal tube crimpled to form a plurality of bends with a volatile fluid confined within it and a suitable end piece P attached to each end for engaging the thermostat in operatable position. The thermostat will lengthen longitudinally by the expansion of the metal of which the tube is made when vaporized fluid of a temperature slightly higher than the surrounding atmosphere comes in contact with it, and the expansion of the tube is assisted by the internal pressure within it which has a tendency to straighten out the tube, this internal pressure is created by the volatile fluid being expanded by the same temperature which expands the metal tube. G is an air outlet valve having a conical faced end and four guide lugs H and a pin O with a flanged end for engaging the upper end of the thermostat. K is an adjusting screw pin having a valve seat K' in its bottom end and air exhaust outlet K² and a slot *s* in its top end. The pin is screwed upwardly or downwardly to position the valve seat so it will be engaged by the faced end of the valve G when the thermostat expands; the pin being screwed upwardly or downwardly proportionally to the maximum expansion of the thermostat which varies with the variable temperature of the steam or heated vapor in the chamber C. I is a longitudinally movable round plate having a pin N with a flanged end for engaging the lower end of the thermostat and having a longitudinal port R through it and the pin. M is a rigid diaphragm mounted within the valve casing for separating the inlet chamber from the combined thermostat and valve chamber and has a longitudinal port M' through the center of it. L is a cushion spring located between the plate I and the rigid diaphragm M under sufficient compression to exert a pressure against the under side of the plate I slightly greater than the expansion force of the thermostat and prevents the air valve G and the air valve seat K' from being damaged by jamming together when the valve seat is improperly adjusted. J are lugs to prevent upward travel of the movable plate I so that the spring L cannot force the plate I and the thermostat F upwardly and seat the valve G.

The operation of the valve is as follows: The valve is shown open in position for exhausting the air. Air from the vessel to which the valve is attached enters the inlet chamber D through the inlet E and passes through the port M' and through the port R and through the port $K^2$ in the pin K and out through the port B' in the top of the cap B. When all of the air has been exhausted from the vessel through the valve the steam or other heated vaporized fluid, which is of a higher temperature than the air, comes in contact with the thermostat, the thermostat is expanded, the valve G is moved upwardly against its seat K' and the steam or vaporized fluid is prevented from flowing through the ports $K^2$ and B'. The atmosphere surrounding the valve body being of a temperature less than the temperature of the steam or other vaporized fluid within the chamber C gradually cools the valve body and the fluid in the chamber C and the thermostat contracts thus pulling the valve from its seat and the operation as is stated is repeated.

Figure 4:
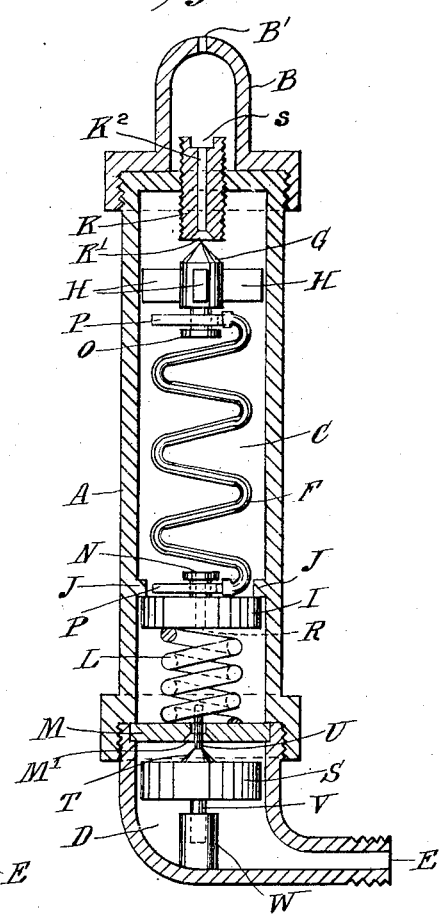
Fig. 4 is a longitudinal sectional view of a modification of Fig. 1.
Figure 2:
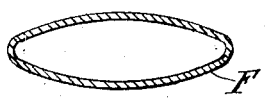
Fig. 2 is a transverse cross-section of the thermostat which is embodied in Fig. 1.
Figure 3:
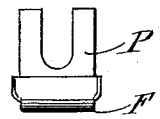
Fig. 3 is a top plan view of the end attached to the upper end of the thermostat.

In Fig. 4 I have illustrated a modification of the valve shown in Fig. 1, in so far as the inlet chamber D and the rigid diaphragm M are concerned. I have embodied in the inlet chamber a guide lug and a float with a valve attached to the top of it and have shown the port M' through the center of the rigid diaphragm M with its lower edge beveled to form a beveled seat. All the other parts are similar to the parts shown in Fig. 1, are for the same purpose, and bear the same distinguishing marks. The description of the parts shown herein which are in addition to the parts shown in Fig. 1, is as follows: S is a float having a conical valve T attached to the top of it, a guide pin U extending upwardly from the center of the top of the valve, and a guide pin V extending downwardly from the center of the bottom of it. This float is employed to rise and seat the valve T to prevent liquid, which may enter the valve body, from flowing into the chamber C and from being discharged through the ports in the screw pin and the cap. W is a guide lug extending upwardly from the bottom of the inside of the inlet chamber D and has a longitudinal hole in its center in which the guide pin V of the float S is loosely engaged. By eliminating the float S and the valve T this valve can be employed for the same purpose as the valve shown in Fig. 1. The operation of the valve is the same as in Fig. 1 in so far as similar parts are concerned. The additional parts operate as follows: If water or other liquid enters the valve body by being forced therein by the air or the fluid in the vessel to which the valve is attached, the float S will rise and seat the valve T and hold the liquid from passing up beyond the diaphragm M and the valve will remain closed as long as there is sufficient liquid within the inlet chamber to buoy the float. The float would operate in the same manner should water or other liquid follow the air into the valve body.

Obviously, some features and parts of this invention may be used without others, and my invention may be embodied in widely varying forms. I am not to be understood as limiting myself to the arrangement and combination and form of parts as shown and described as other arrangements and combinations and equivalents of parts may be used to variously modify my invention within the scope of the subjoined claims.

Therefore, without limiting myself to the construction shown and described, nor enumerating equivalents, I claim as my invention.

1. In a valve, the combination of a casing or body having an inlet chamber and a combined thermostat and valve chamber, an air outlet valve with projecting guide lugs and a corresponding adjustable seat located in the said combined thermostat and valve chamber, a rigid diaphragm separating the said inlet chamber and the said combined thermostat and valve chamber, a thermostat comprising a metal tube crimpled in serpentine form to produce a plurality of bends in the same plane located within the said combined thermostat and valve chamber with its upper end engaging the said air outlet valve for actuating the said air outlet valve, and movable means independent of the said diaphragm and the bottom of the casing for engaging the lower end of the thermostat, as and for the purpose set forth.

2. In a valve, the combination of a casing or body having an inlet chamber and a combined thermostat and valve chamber, an air outlet valve with projecting guide lugs and a corresponding adjustable seat located in the said combined thermostat and valve chamber, a rigid diaphragm separating the said inlet chamber and the said combined thermostat and valve chamber, a thermostat within the said combined thermostat and valve chamber with its upper end engaging the said air outlet valve for actuating the said air outlet valve, movable means independent of the said diaphragm and the bottom of the casing for engaging the lower end of the thermostat, and a spring located between the said means and the said rigid diaphragm, as and for the purpose set forth.

3. In a valve, the combination of a casing or body having an inlet chamber and a combined thermostat and valve chamber, an air outlet valve with projecting guide lugs and a corresponding adjustable seat located in the said combined thermostat and valve chamber, a rigid diaphragm separating the said inlet chamber and the said combined thermostat and valve chamber, a thermostat within the said combined thermostat and valve chamber with its upper end engaging the said air outlet valve for actuating the said air outlet valve, movable means independent of the said diaphragm and the bottom of the casing for engaging the lower end of the thermostat, a float within the said inlet chamber having a valve attached to the top of it and upwardly and downwardly extending guide pins, a valve seat in the diaphragm against which the said valve on the top of the said float seats, and a guide lug extending upwardly from the inside of the bottom of the inlet chamber, as and for the purpose set forth.

4. In a valve, the combination of a casing or body having an inlet chamber and a combined thermostat and valve chamber, an air outlet valve with projecting guide lugs and a corresponding adjustable seat located in the said combined thermostat and valve chamber, a rigid diaphragm separating the said inlet chamber and the said combined thermostat and valve chamber, a thermostat with its upper end engaging the said air outlet valve for actuating the said air outlet valve, movable means independent of the said diaphragm and the bottom of the casing for engaging the lower end of the thermostat, a spring located between the said means and the said rigid diaphragm, a float within the said inlet chamber having a valve attached to the top of it and upwardly and downwardly extending guide pins, a valve seat in the said diaphragm against which the said valve on the top of the said float seats, and a guide lug extending upwardly from the inside of the bottom of the inlet chamber, as and for the purpose set forth.

5. In a valve, the combination of a casing or body having an inlet chamber and a combined thermostat and valve chamber, an air outlet valve and a corresponding adjustable seat located in the said combined thermostat and valve chamber, a rigid diaphragm separating the said inlet chamber and the said combined thermostat and valve chamber, a thermostat comprising a metal tube crimpled in serpentine form to produce a plurality of bends in the same plane with a volatile fluid confined therein and a suitable piece attached to each end of it for engaging it in operating position, and movable means independent of the said diaphragm and the bottom of the casing for engaging the lower end of the thermostat, as and for the purpose set forth.

6. In a valve, the combination of a casing or body having an inlet chamber and a combined thermostat and valve chamber, an air outlet valve and a corresponding adjustable seat located in the said combined thermostat and valve chamber, a rigid diaphragm separating the said inlet chamber and the said combined thermostat and valve chamber, a thermostat comprising a metal tube crimpled in serpentine form to produce a plurality of bends in the same plane with a volatile fluid confined therein and a suitable piece attached to each end of it for engaging it in operating position, movable means independent of the said diaphragm and the bottom of the casing, for engaging the lower end of the thermostat, and a spring located between the said means and the said rigid diaphragm, as and for the purpose set forth.

7. In a valve, the combination of a casing or body having an inlet chamber and a combined thermostat and valve chamber, an air outlet valve and a corresponding adjustable seat located in the said combined thermostat and valve chamber, a rigid diaphragm separating the said inlet chamber and the said combined thermostat and valve chamber, a thermostat comprising a metal tube crimpled in serpentine form to produce a plurality of bends in the same plane with a volatile fluid confined therein and a suitable piece attached to each end of it for engaging it in operating position, movable means independent of the said diaphragm and the bottom of the casing for engaging the lower end of the thermostat, a float within the said inlet chamber having a valve attached to the top of it and upwardly and downwardly extending guide pins, a valve seat in the said diaphragm against which the said valve on the top of the said float seats, and a guide lug extending upwardly from the inside of the bottom of the inlet chamber, as and for the purpose set forth.

8. In a valve, the combination of a casing or body having an inlet chamber and a combined thermostat and valve chamber, an air outlet valve and a corresponding adjustable seat located in the said combined thermostat and valve chamber, a rigid diaphragm separating the said inlet chamber and the said combined thermostat and valve chamber, a thermostat comprising a metal tube crimpled in serpentine form to produce a plurality of bends in the same plane with a volatile fluid confined therein and a suitable piece attached to each end of it for engaging it in operating position, movable means independent of the said diaphragm and the bottom of the casing for engaging the lower end of the thermostat, a float within the said inlet chamber having a valve attached to the top of it and upwardly and downwardly extending guide pins, a valve seat in the said diaphragm against which the said valve on the top of the said float seats, a guide lug extending upwardly from the inside of the bottom of the inlet chamber, and a spring located between the said means and the said rigid diaphragm, as and for the purpose set forth.

9. In a valve, the combination of a valve body or casing having an inlet and an outlet, several chambers located in the said valve body, an air outlet valve located in one of the said several chambers, and a thermostat for actuating the said valve comprising a metal tube crimpled in serpentine form to produce a plurality of bends in the same plane with a volatile fluid confined therein and a suitable piece attached to each end of it for engaging it in operating position, as and for the purpose set forth.

10. In a valve, the combination of a valve body or casing having an inlet and an outlet, several chambers located in the said valve body, a diaphragm separating the said chambers, an air outlet valve located in one of the said several chambers, a float with a valve attached to the top of it located in the said inlet chambers, a valve seat in the said diaphragm with which the valve attached to the top of the said float coöperates, and a thermostat for actuating the said valve comprising a metal tube crimpled in serpentine form to produce a plurality of bends in the same plane with a volatile fluid confined therein and a suitable piece attached to each end of it for engaging it in operating position, as and for the purpose set forth.

In testimony whereof, I have signed my name to this specification this 7th day of September, 1918.

OWEN MARSHALL JONES.